United States Patent [19]

Gartland, Jr. et al.

[11] Patent Number: 4,658,088
[45] Date of Patent: Apr. 14, 1987

[54] SELF-THREADING POLYMERIC FASTENER

[75] Inventors: Albert J. Gartland, Jr.; James A. Sandor, both of Trumbull, Conn.

[73] Assignee: Harvey Hubbell Incorporated, Orange, Conn.

[21] Appl. No.: 887,986

[22] Filed: Jul. 25, 1986

Related U.S. Application Data

[60] Continuation of Ser. No. 729,105, Apr. 30, 1985, abandoned, which is a division of Ser. No. 490,228, Apr. 29, 1983, abandoned.

[51] Int. Cl.$^4$ .......................... H02G 3/14; F16B 35/00
[52] U.S. Cl. ...................... 174/66; 411/378; 411/411; 411/501; 411/908
[58] Field of Search ............... 411/378, 337, 366, 386, 411/392, 424, 500, 548, 904–908, 504–507, 501, 411; 174/66; 220/3.8, 241, 242; 339/123, 122 R, 122 F; 264/152

[56] References Cited

U.S. PATENT DOCUMENTS

| | | | |
|---|---|---|---|
| 2,510,693 | 6/1950 | Green | 411/501 |
| 2,901,938 | 9/1959 | Van Buren | 411/437 |
| 2,969,705 | 1/1961 | Becker | 411/437 X |
| 3,173,466 | 3/1965 | Starriett | 411/304 |
| 3,193,615 | 7/1965 | Burrows | 174/138 F |
| 3,345,899 | 10/1967 | Fiddler | 411/437 |
| 3,359,847 | 12/1967 | Richmond | 411/506 |
| 3,414,034 | 12/1968 | Imse | 411/304 |
| 3,491,646 | 1/1970 | Tinnerman | 411/436 |
| 3,495,494 | 2/1970 | Scott | 411/411 |
| 3,921,364 | 11/1975 | Briles | 411/378 X |
| 4,355,198 | 10/1982 | Gartland | 174/66 |
| 4,472,097 | 9/1984 | Kiefer | 411/907 X |

FOREIGN PATENT DOCUMENTS

| | | | |
|---|---|---|---|
| 1469622 | 1/1967 | France | 411/437 |
| 872839 | 7/1961 | United Kingdom | 411/908 |

OTHER PUBLICATIONS

Allan B. Dove, Steel Wire Handbook, vol. 3, 1972, pp. 452–455.

Primary Examiner—Gary L. Smith
Assistant Examiner—Adrian H. Whitcomb, Jr.
Attorney, Agent, or Firm—Jerry M. Presson; Alfred N. Goodman; Walter C. Farley

[57] ABSTRACT

A self-threading polymeric fastener and blank therefor which can be used, for example, to support a wall plate over an electrical outlet or switch. The fastener blank comprises three portions, all integrally molded together, including a slotted head, a substantially cylindrical shank and a tapered tip. A helical thread is formed on the shank and tip by deforming the outer surfaces thereof without removing any significant amount of polymeric material therefrom. This is accomplished by rotating the tip and shank in a helically threaded bore, such as that provided in an outlet or switch. The polymeric fastener blank can be integrally molded with a polymeric wall plate to make their colors identical.

4 Claims, 13 Drawing Figures

SELF-THREADING POLYMERIC FASTENER

This is a continuation of application Ser. No. 729,105 filed Apr. 30, 1985 and now abandoned, which is a division of application Ser. No. 490,228 filed Apr. 29, 1983 and now abandoned.

FIELD OF THE INVENTION

The invention relates to a self-threading polymeric fastener which functions somewhat as a screw and to a blank therefor, which can be used, for example, to support a wall plate over an electrical outlet or switch. Helical threads are formed on the shank of the polymeric screw blank by deforming the initially smooth outer surface of the shank without removing any significant amount of polymeric material therefrom by rotating the shank in a threaded bore. The polymeric blank can be integrally molded with and attached to a polymeric wall plate to make their colors identical.

BACKGROUND OF THE INVENTION

Wall plates for electrical outlets or switches are traditionally fastened by small metal screws. When these wall plates are made of variously colored polymeric material, the heads of the metal screws preferably should be colored by painting or plating to provide an identical color match. However, the color matching is not always satisfactory, and in addition considerable time and costs are involved in material handling and inventory control for maintaining suitable colored metal screws for the variously colored wall plates.

Forming the wall plate screws of polymeric material of a similar color would partially solve the material handling and inventory problems. However, known polymeric screws have threads cut therein, resulting in a weakening of the screw shank structure and easy breakage of the screw under the torque required for attaching a wall plate against an underlying surface. In addition, even when the screws are molded from the same polymeric material as is used for the wall plates, it is substantially impossible to achieve a good consistent color match with the plates because even minor variations in such production parameters as temperature cause very noticeable changes in hue and shade. Examples of prior art polymeric screws having cut threads are disclosed in U.S. Pat. Nos. 2,510,693 to Green and 3,345,899 to Fiddler.

SUMMARY OF THE INVENTION

Accordingly, a primary object of the invention is to provide a polymeric fastener having characteristics which permit it to withstand torque applied to it in mounting a wall plate for completing an electrical outlet enclosure without generating that torque which would cause a conventional screw to shear.

Another object of the invention is to provide a polymeric fastener that may be integrally molded with and attached to a polymeric wall plate from the same batch of polymeric material under the same conditions in order to provide a good color match and to reduce material handling problems and inventory controls.

Another object of the invention is to provide a polymeric screw-like fastener that is "self-threading" or self-forming in the threaded bore provided in an electrical outlet or switch.

The foregoing objects are basically attained by providing a self-threading polymeric fastener blank comprising a head having means shaped to engage a rotatable screw driving mechanism; a shank having first and second ends, the first end extending integrally from the head; and a tip extending integrally from the second end of the shank, the shank having a smooth, substantially cylindrical outer surface, and the tip having a smooth frustoconical outer surface tapering inwardly from the shank.

The foregoing objects are also basically attained by providing a self-threaded polymeric screw comprising a head having a transverse slot for receiving a rotatable screw driving mechanism; a shank having first and second ends, the first end extending integrally from the head, the shank being substantially cylindrical; a tip extending integrally from the second end of the shank, this tip tapering inwardly from the shank; and a helical thread formed on the shank by deforming the outer surface of the shank without removing any significant amount of polymeric material therefrom.

Advantageously, in addition to threading the shank, the tapering tip of the screw is also threaded by deforming the outer surface thereof without removing any significant amount of polymeric material therefrom.

Such a screw blank is advantageously formed from a material that deforms under compressive loads and conforms to the structure deforming it without fracturing. Such material under compression has cold flow characteristics and stress relieves itself. An example of a material having these properties is NYLON ZYTEL 101 resin, which is a polyamide resin manufactured by the DuPont company.

By using a material having such properties, the helical threads on the fastener are formed by deformation rather than cutting. Cutting results in the removal of material and the formation of notches, thus resulting in a reduction in the overall volume of the original blank and a weakened structure which may be aggravated by the presence of the notches.

As will be recognized from the following description, a fastener in accordance with the invention can be used for attaching components other than wall plates, one example being attaching license plates to the internally threaded or shaped brackets on a motor vehicle.

Other objects, advantages and salient features of the invention will become apparent from the following detailed description which, taken in conjunction with the annexed drawings, discloses preferred embodiments of the invention.

DRAWINGS

Referring now to the drawings which form a part of this original disclosure:

DETAILED DESCRIPTION OF THE INVENTION

Figure 1:
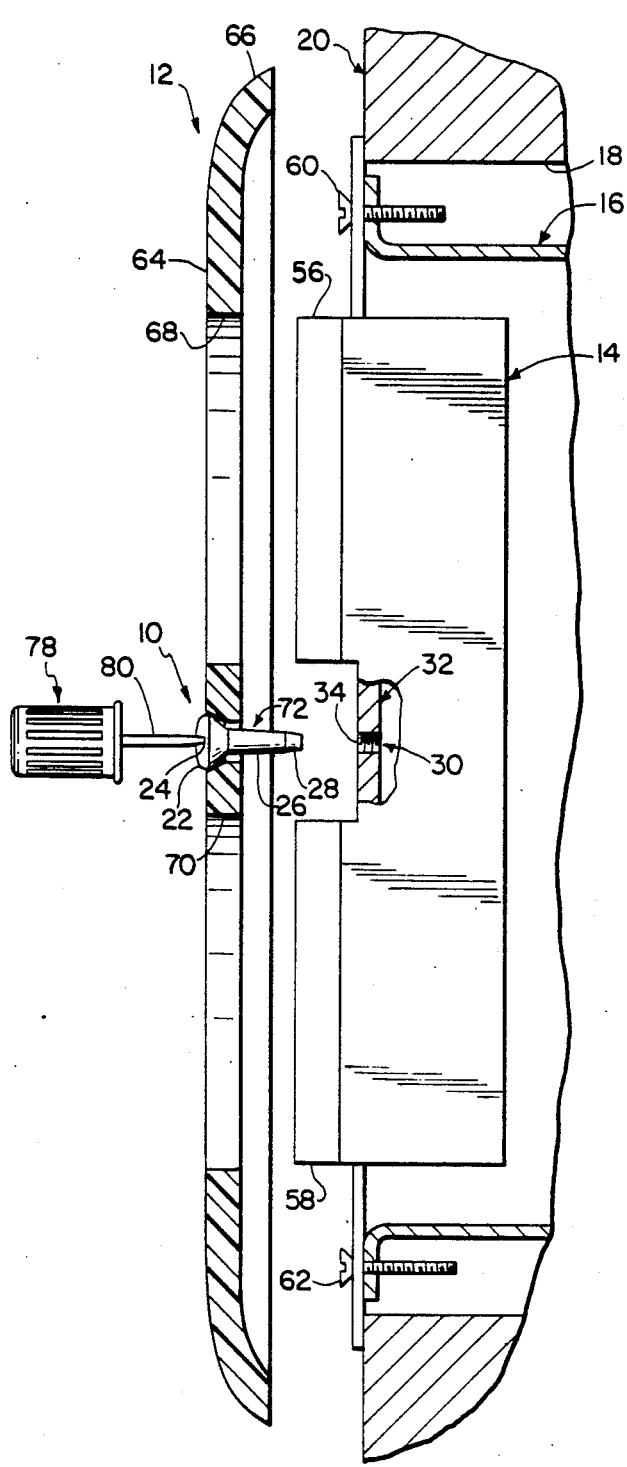
FIG. 1 is an elevational view in longitudinal section of a wall plate having the screw blank in accordance with the invention supported therein with the wall plate being located spaced from a duplex outlet mounted in a box in a wall.

As will become apparent from the following description, the fastener of the present invention does not start out as a screw in the conventional sense. Rather, it starts as a smooth, elongated body with a head and, after attachment, becomes a type of fastener which most closely resembles a screw. Despite this slight semantic inaccuracy, the terms "screw blank" and "screw" will be used herein to describe the fastener in these states.

Referring now to FIGS. 1–9, the screw blank 10 in accordance with the invention is shown by way of example coupling a duplex outlet wall plate 12 over a duplex outlet 14 which is supported in an outlet box 16 received in a hole 18 in a wall 20.

Figure 3:
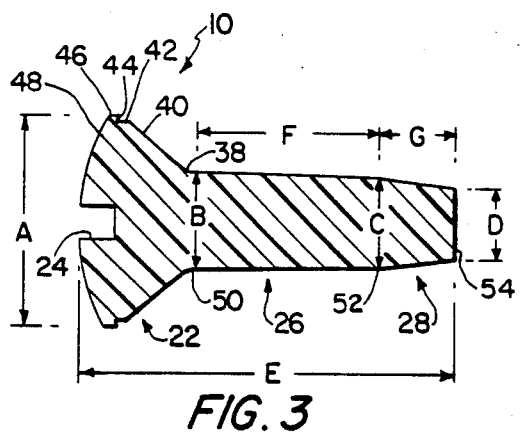
FIG. 3 is an enlarged, elevational view in longitudinal section of the screw blank shown in FIG. 1.
Figure 4:
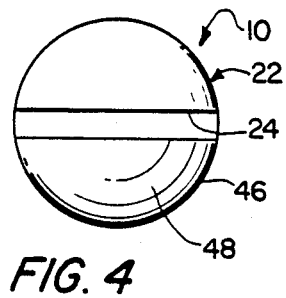
FIG. 4 is a left-side elevational view of the screw blank shown in FIG. 3 illustrating the transverse slot in the head.

The screw blank 10 is comprised of a head 22 having a transverse slot 24 therein, a shank 26 and a tip 28, all three of these portions being integrally formed as a one-piece member molded of polymeric material, such as NYLON ZYTEL 101 resin as indicated in FIG. 3. This material deforms under compressive loads and conforms via stress relief to the structure compressing it without cutting or fracturing of the material. This property is known as cold flow which is defined as the continuing dimensional change that follows initial instantaneous deformation in a nonrigid material under static load. In the case of the NYLON ZYTEL 101 resin, the material stress relieve itself up to 2000 psi.

As will be recognized, head 22 could be provided with a Phillips, Allen or hexagonal type of head for various applications although a slotted head is conventional for outlet and switch plates. The screw blank 10 is self-threaded by rotating it in the bore 30 located in a bridge 32 in the duplex outlet 14, the bore having internal helical threads 34 thereon. The resulting helical threads on the screw blank 10 are designated 36 as seen in FIGS. 2 and 7–9.

Referring now to FIG. 3, the screw blank 10 is clearly shown comprised of a one-piece member including head 22, shank 26 and tip 28.

The head 22 has a curved annular portion 38 adjacent diameter B, the maximum radius of the curved annular portion being about 0.020 inch. Extending from this portion 38 is a frustoconical portion 40 which tapers inwardly toward the tip 28 of the screw blank, the taper being about 41° with the frustoconical portion 40 encompassing about 82°. Extending from the frustoconical portion is a cylindrical portion 42 which in turn extends into an annular shoulder 44 which faces the tip 28. Extending from shoulder 44 is a second cylindrical portion 46 which in turn extends into an end portion 48 in the form of a portion of a sphere. The transverse slot 24 penetrates this end portion 48 and extends into the cylindrical portion 46. The slot is preferably rectangular in cross section.

The shank 26 has a smooth outer surface which is substantially cylindrical although it can taper slightly inwardly from the first end 60 of the shank to the second end 52. As seen in FIG. 3, the shank 26 extends integrally at its first end 50 from the curved annular portion 38 of head 22.

Figure 5:
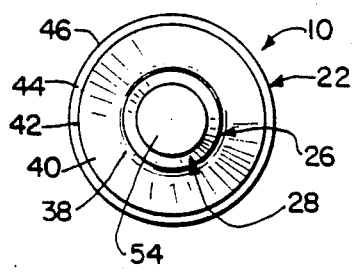
FIG. 5 is a right-side elevational view of the screw blank shown in FIG. 3.

The tip 28 extends integrally from the second end 52 of the shank and has a smooth outer surface, advantageously being frustoconical and tapering inwardly at an angle of about 6.5° from the second end 52 to the free end 54 of the tip and encompassing about 13°. This free end 54 is circular as seen in FIG. 5.

Advantageously, the largest diameter of the head 22 of the screw blank, which is in the region of cylindrical portion 46 and which is designated A in FIG. 3, is about 0.275 inch. Diameter B located at the first end 50 of the shank is about 0.128±0.002 inch while diameter C at the second end 52 of the shank is about 0.124±0.002 inch. Diameter D at the free end 54 of the tip is about 0.100±0.002 inch.

The overall length E of the screw blank is about 0.500 inch, with the shank 26 having a longitudinal length F of about 0.248 inch and with the tip 28 having a longitudinal length G of about 0.100 inch. Slot 24 is advantageously 0.040 inch wide and 0.045 inch deep. The two cylindrical portions 42 and 46 on head 22 are advantageously about 0.015±0.002 inch long and the shoulder 44 is about 0.000 to 0.004 inch wide.

The ratio of the maximum diameter of the shank outer surface to the maximum diameter of the tip frustoconical outer surface is, based on these dimensions and tolerances, from about 1.066 to 1 to about 1 to 1. The ratio of the longitudinal lengths of the shank to the tip is about 2.48 to 1, based on these dimensions. Thus, the ratio of the diameter B of the shank at the first end to the diameter C of the shank at the second end is also from about 1.006 to 1 to about 1 to 1. And the ratio of the diameter C of the shank at the second end to the diameter D of the tip at the free end is from about 1.286 to 1 to about 1.196 to 1.

Referring again to FIGS. 1 and 2, the duplex outlet 14 is shown having a pair of female connectors 56 and 58 with the outlet 14 being coupled via screws 60 and 62 to the outlet box 16, which can be metallic or polymeric.

Figure 2:
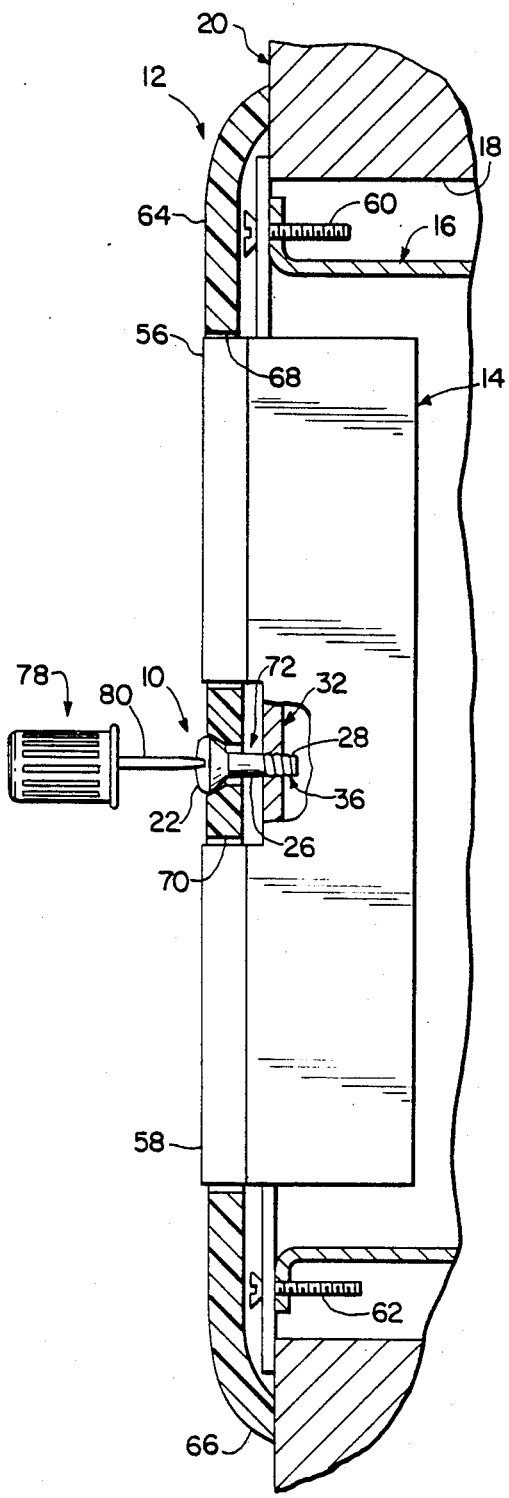
FIG. 2 is an elevational view similar to that shown in FIG. 1 except that the wall plate has been received over the outlet and the screw blank has been rotated by a screw driver into a threaded bore in the outlet, thereby self-threading the shank of the screw blank and coupling the wall plate to the outlet.
Figure 6:
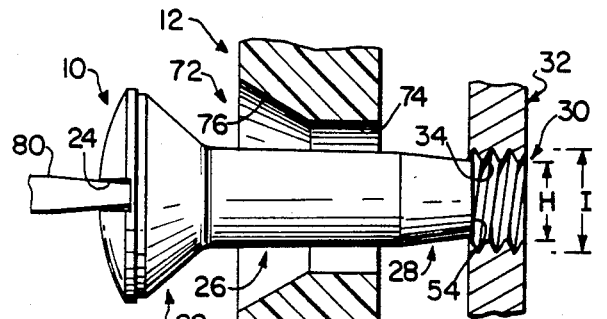
FIG. 6 is a fragmentary, elevational view in longitudinal section of a wall plate having a central aperture receiving the screw blank therein, the screw blank being engaged by a screw driver and the tip of the screw blank being received in a threaded bore in a bridge located in the outlet shown in FIGS. 1 and 2.

As seen in FIGS. 1 and 2, as well as in enlarged FIG. 6, the internal helical threads 34 in the bore 30 have a uniform minor diameter H of about 0.1042 inch and a uniform major diameter I of about 0.1380 inch. These are the standard diameters corresponding to a No. 6/32 screw which has 32 threads per inch. Typically, the width of the bridge 32, which can be metallic or polymeric for purposes of the present invention, is about 0.060 to 0.090 inch, and thus the longitudinal length of the bore 30 is about 0.060 to 0.090 inch and has about two or three threads formed therein. While a through bore 30 is shown, a blind threaded bore can be utilized with the screw blank in accordance with the invention since no shavings or cuttings results from formation of the helical threads 36 on the screw blank.

Referring now to FIGS. 1, 2, 6-9, 10 and 11, the polymeric duplex outlet plate 12 is shown formed from a planar body member 64 having a depending rectangular peripheral flange 66 formed therewith. The planar body member 64 is interrupted by two openings 68 and 70 which are configured to receive therein as seen in FIG. 2 the female connectors 56 and 58 on duplex outlet 14. Centrally located in the planar body member is a central aperture 72 comprised of a cylindrical bore 74 extending from the inner surface thereof and a frustoconical bore or countersink 76 extending from the cylindrical bore to the outer surface of the planar body member.

As seen in FIGS. 1 and 2, the screw blank 10 can be rotated by means of a screw driver 78 having a tapered shaft 80 receivable in the slot 24 in the screw blank.

SELF-THREADING OPERATION

To couple the wall plate 12 to the duplex outlet 14 and thus cover the outlet box 16, the wall plate 12 is moved adjacent the duplex outlet 14 as seen in FIG. 1 with a screw blank 10 received in central aperture 78 and held in place by screw driver 78 received in the slot 24 in the screw blank. The wall plate 12 is placed against the wall 20 as seen in FIG. 2 with the openings 68 and 70 therein receiving the female connectors 56 and 58.

Then, with the screw driver 78 engaging the screw blank, the tip 28 is inserted into the threaded bore 30 in the bridge 32 as seen best in FIG. 6.

Figure 7:
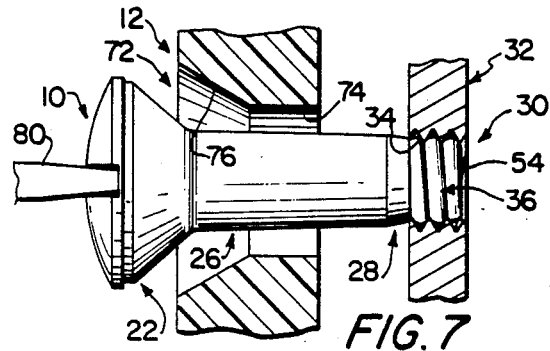
FIG. 7 is a view similar to that shown in FIG. 6 except that the screw blank has been rotated relative to the threaded bore, resulting in the forming of helical threads on the tip of the screw blank.

Next, the screw blank 10 is rotated so that the internal threads 34 in bore 30 form the helical threads 36 on the tip 28 as seen in FIG. 7 as the screw blank moves longitudinally into bore 30.

Figure 8:
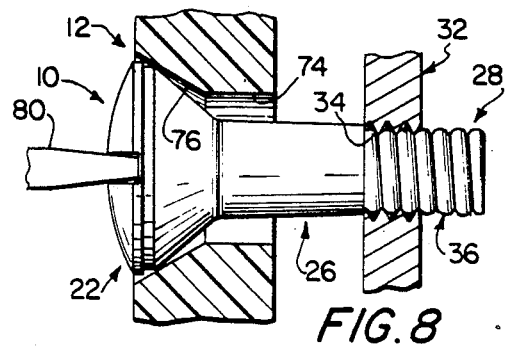
FIG. 8 is a view similar to that shown in FIG. 7 except that the screw blank has been further rotated relative to the threaded bore so that helical threads are formed on the shank of the screw blank in addition to the tip, the head of the screw being fully received in the wall plate aperture.

This rotation and longitudinal movement continues as seen in FIG. 8 until the head 22 of the screw blank is fully seated in frustoconical bore 76 in the wall plate as more of the helical threads 36 are formed on the shank 26 of the screw blank. In the position shown in FIG. 8, the screw blank 10 is fully threaded and fully received in the wall plate, the space between the wall plate 12 and the bridge 32, also seen in FIG. 2, being maintained by engagement of the flange 66 on the wall plate with the wall 20.

As seen in FIGS. 7 and 8, the threads 36 formed on the tip and shank of the screw blank do not have perfectly formed inverted V-shaped crests but rather somewhat curved crests, while the roots of the threads are substantially more V-shaped. In addition, by comparing FIGS. 8 and 9, it is noted that the major diameter of the helical threads 36 on the screw blank increase after the passage of time due to the cold flow capabilities of the material forming the screw blank. Since the material of the screw blank deforms under the compressive load provided by the internal threads 34, the helical threads 36 are formed, not cut, in the blank. Thus, there is no fracturing or cutting of the blank, which would result in a weakened structue of less volume of material, and accordingly, a significant amount of polymeric material is not removed from the blank.

It is well known that metal or plastic screws tend to shear either at the head end of the cut threads or along the root diameter H of the threaded body because those are locations where the screw usually has the smallest cross-sectional area and the highest unit stress. It is particularly significant that a fastener in accordance with the present invention withstands torque which would shear off most screws of similar size because the formed threads of the invention tend to slip or snap from one thread to the next in the bore when the fastener is overtorqued. Thus, the threads tend to yield elastically rather than shearing.

Figure 9:
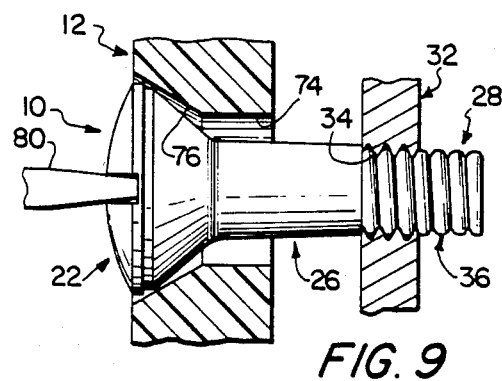
FIG. 9 is a view similar to FIG. 8 except that with the passage of time the major diameter of the helical threads formed on the screw blank shank have expanded due to the cold flow capabilities of the screws' material.

If desired, the screw blank 10 seen in FIG. 9 can be rotated in the opposite direction and withdrawn from the bridge 32, the threads 36 remaining thereon, thereby allowing reuse of the now threaded screw blank.

FIGS. 10 AND 11

Figure 10:
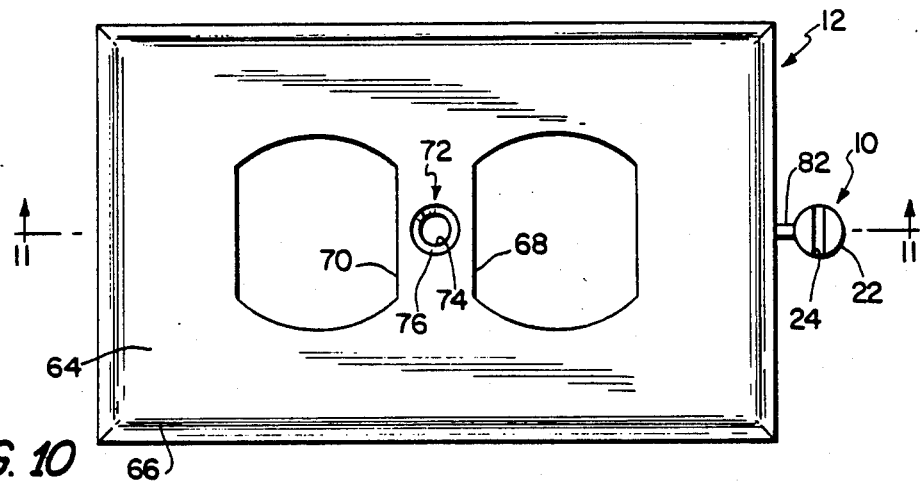
FIG. 10 is an elevational view of a polymeric duplex outlet wall plate having a screw blank integrally formed therewith and coupled by a short web.
Figure 11:
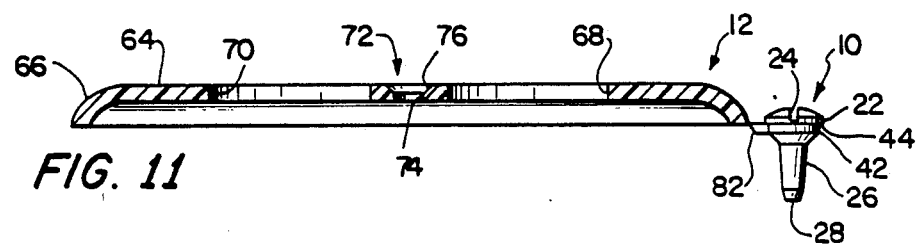
FIG. 11 is an elevational view of the duplex outlet wall plate in section taken along line 11—11 in FIG. 10.

As seen in FIGS. 10 and 11, the wall plate 12 and the fastener or screw blank 10 discussed above are again illustrated except that the screw blank is shown integrally formed with and connected to the wall plate 12 via a web 82 of polymeric material. Advantageously, the longitudinal axis of the screw blank 10 is perpendicular to the planar body member 64 and the web 82 extends from an edge of the peripheral flange 66 at the bottom thereof. In addition, the web extends into shoulder 44 and cylindrical portion 42 of the screw blank 10. By integrally molding the screw blank with the wall plate, out of the same batch of polymeric material, the two parts have substantially the same color. In addition, since the screw blank is attached to the wall plate, material handling and inventory problems are reduced.

FIGS. 12 AND 13

Figure 12:
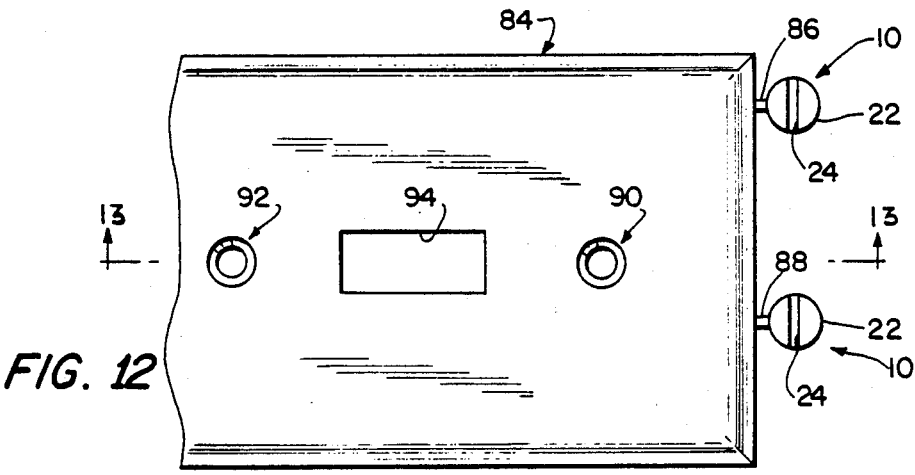
FIG. 12 is an elevational view of a switch wall plate having a pair of screw blanks integrally formed therewith and coupled thereto via webs.
Figure 13:
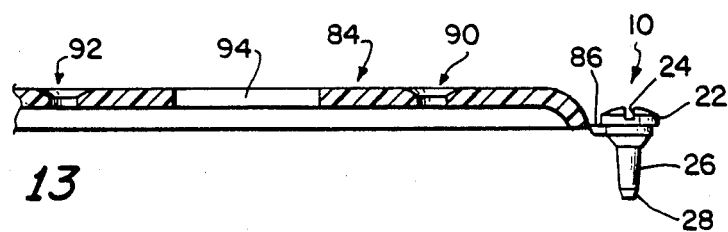
FIG. 13 is an elevational view of the switch wall plate in section taken along line 13—13 in FIG. 12.

As seen in FIGS. 12 and 13, a switch plate 84 formed of polymeric material can be integrally formed with and coupled via webs 86 and 88 with two screw blanks 10 for use with the two apertures 90 and 92 typically provided in a switch plate. As shown, a rectangular switch aperture 94 is located in the switch plate 84 between apertures 90 and 92, which are intended to receive the screw blanks 10.

While various advantageous embodiments have been chosen to illustrate the invention, it will be understood by those skilled in the art that various changes and modifications can be made therein without departing from the scope of the invention as defined in the appended claims.

What is claimed is:

1. A fastener assembly comprising:
    a member having a threaded bore therein;
    a plate having an aperture therethrough; and
    a self-threading polymeric screw comprising
        a head having a transverse slot for receiving a rotatable screw driving mechanism,
        a shank having first and second ends, the first end extending integrally from said head, said shank being substantially cylindrical,
        a tip extending integrally from the second end of said shank, said tip tapering inwardly from said shank, and
        a helical thread permanently cold formed on said shank by deforming the outer surface of said shank without removing any significant amount of polymeric material therefrom by rotating said screw in said threaded bore, said shank being received in the aperture in the plate, said helical thread formed on said shank being threadedly engaged with the threads in the threaded bore, said plate and said screw being comprised of the same polyamide resin, said helical thread having rounded crests.

2. A fastener assembly accoring to claim 1 wherein the plate is a wall plate, and the member is an electrical outlet or switch.

3. A fastener assembly according to claim 1 wherein said helical threads of said screw shank have first diameters at said thread crests;

said threaded bore having major diameters between the roots of said screw threads and minor diameters between the crests of said screw threads, the major diameters being greater than said minor diameters;

said first diameters being between the minor diameters and said major diameters.

4. In a fastening assembly including a wall plate, an electrical wiring device and a rotatable polymeric fastener for mounting the wall plate on the electrical wiring device, said device having a bore with an internal helical thread with respective root and crest portions and a thread groove of V-shaped cross section between adjacent crest portions, the improvement wherein the fastener comprises:

an elongated shank formed with an external helical thread having respective root and crest portions, said crest portions being rounded, said root portions of said fastener having a diameter substantially equal to the diameter of said crest portions of said internal thread of the device for making close threaded engagement therewith, and said crest portions of said fastener being shaped to occupy less than the full cross-sectional area of said thread groove, whereby said crest portions of said fastener slip over said crest portions of the device upon over torquing rotation of said fastener, said fastener being comprised of the same material as said wall plate.

* * * * *